Sept. 8, 1931.   S. E. BROWN   1,822,839
LIGHT DIRECTING MEANS
Filed April 3, 1925   2 Sheets-Sheet 1

INVENTOR
SUMNER E. BROWN
BY
ATTORNEYS

Sept. 8, 1931.  S. E. BROWN  1,822,839
LIGHT DIRECTING MEANS
Filed April 3, 1925   2 Sheets-Sheet 2

INVENTOR
SUMNER E. BROWN
BY
ATTORNEYS

Patented Sept. 8, 1931

1,822,839

UNITED STATES PATENT OFFICE

SUMNER E. BROWN, OF DEDHAM, MASSACHUSETTS, ASSIGNOR, BY MESNE ASSIGNMENTS, TO GUIDE LAMP CORPORATION, OF ANDERSON, INDIANA, A CORPORATION OF DELAWARE

LIGHT DIRECTING MEANS

Application filed April 3, 1925. Serial No. 20,444.

This invention relates to improvements in light directing means, and particularly to the adaptation of such means to the requirements of automobile driving.

It has been found desirable in driving in the open country at relatively high speeds to have the light from the head lamps of the automobile so distributed as to illuminate the roadway for a considerable distance in advance of the machine. This far flung beam carries with it the objection that slight inclinations in the roadway or longitudinal rocking of the frame of the car will throw the light into the eyes of approaching motorists or pedestrians, thus blinding them. In other words, while it is desirable from the driver's point of view in giving him the most useful distribution of light, the adjustment of the angle of projection of the beam with respect to the angle in which blinding rays would be projected is too critical. In order to provide for an alleviation of this condition for the benefit of approaching travellers and particularly to provide for driving through the lighted streets of a city where, at the reduced speeds required by law, no such far flung beam is necessary, it is desirable to provide an alternative light distribution in which a greater angle is provided between the projected beam and the line of glare, thus rendering far less frequent the production of glare owing to variation in road surface and vehicle frame positioning and at the same time providing a desirable concentration of light nearer the car for city driving where the driving path is more frequently crossed and obstructed.

Many attempts have been made heretofore to accomplish these results. Thus devices have been provided for tilting the reflector or lamp casing so as to lower the projected beam. These constructions are complicated, expensive, and lay ample foundation for subsequent rattling and maladjustment. Another common expedient based on a slightly different conception is the provison of dimming arrangements or secondary lighting sources of lower candle power in an effort to modify the intensity of the beam rather than its direction. This carries with it the objection that insufficient illumination is then afforded, resulting not infrequently in the striking of pedestrians walking along the side of the road when the lights are dimmed in courtesy to a passing car.

It is a primary object of my invention to provide a simple and effective light directing means for securing selectively the described variations in light distribution, and, while designed primarily for the requirements of automobile lighting, it is not limited in its application thereto.

In carrying out this object I have provided a light directing means in combination with a lighting means capable of providing a source of light at two different points, the light directing means being so formed and the positions being so chosen with respect to the light directing means as to give the effect of a lowering of the projected beam upon a shift in the position of the source of light. Specifically, I have combined a reflector of novel construction with a plurality of light sources, said sources being so positioned with respect to the reflector as to provide upon energization of the one source, among other effects, a far flung beam the top of which makes a slight angle with respect to the line of glare, thereby effectively illuminating the road for a considerable distance ahead and, upon energization of another source, a lowering of the top of said beam, thereby rendering the angle less critical, and providing greater concentration of light near the car, thus effectively illuminating the adjacent roadway for low speed city driving.

The light sources hereinbefore referred to are preferably constituted by independent filaments in a single light bulb, said filaments being preferably adapted to emit substantially the same quantities of light, thus avoiding the faulty illumination resulting from dimming, such filaments being so located with respect to the reflector as to effect selective variation in light distribution as described.

In designing a reflector which will accomplish the results described I have encountered the following problems and have had to find a solution for each of them.

First, the downward deflection of the beam when shifting from one light source to the other must not be too great else improper illumination will be provided under one or the other of the conditions of driving. The amount of this deflection is dependent upon the distance between the filaments and the design of the reflector. I have accordingly so designed my light bulb and my reflector as to provide the right amount of downward deflection, neither too little or too great, to furnish proper lighting in both instances.

The second problem is a corollary of the first. If the top of the beam is turned downward very sharply by a change of a fraction of an inch in the position of the light source it is apparent that a change of a very small fraction of an inch in the position of the filament resulting from inaccuracies in bulb manufacture will throw the top of the beam off by an appreciable amount with possibility of glare. This evil is accentuated if the most intense rays from the reflector are at the top of the beam for then in case of inaccuracies in manufacture, the most intense rays of light from the lamp may be shot upward sufficiently to produce glare of the most dazzling kind. I have overcome this difficulty by choosing for the top of my beam rays from portions of my reflector which receive light of relatively low intensity, these portions being so chosen that the deflection produced by a shifting of light source is sufficiently small so as to make negligible the much smaller changes in direction of rays resulting from inaccuracies in filament positioning.

Third, it is not sufficient for the best lighting to merely shift the top of the beam without regard to accompanying changes in the intensity of different portions of the beam. It is essential that a far flung concentrated beam be provided for normal or open country driving while, in any case a concentration of light near the car is to be avoided, this having the effect of blinding the driver to objects lying outside the area which is brightly lighted. I have accordingly designed my reflector to provide the most desirable distribution of light under the two conditions of driving, while at the same time providing for a lowering of the beam upon a shift in the position of the light source.

Fourth, it is necessary that the projected beam have the proper lateral spread in each case. This may be accomplished in any well known manner, and forms no part of the present invention.

Referring to the drawings which show several embodiments which my invention may assume in carrying out some or all of the objects of invention hereinbefore stated:

Figure 1:
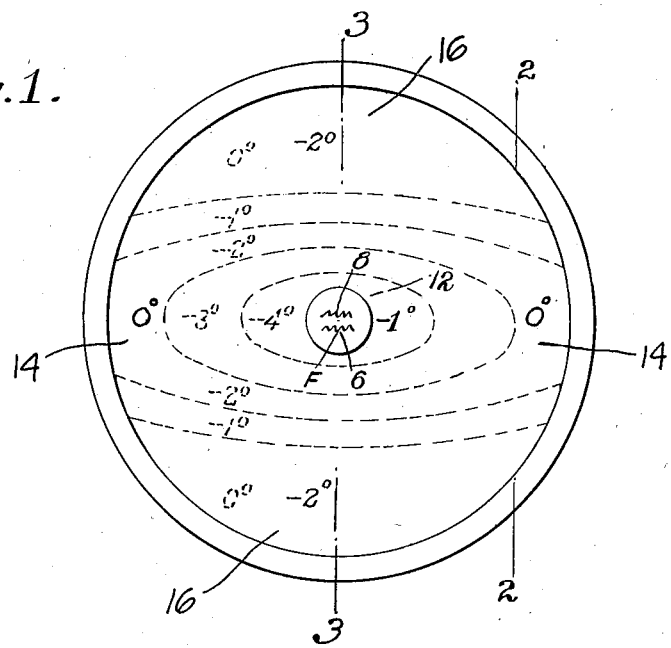
Figure 1 is a front elevation of my improved reflector showing the different segments of surfaces of revolution of which it is composed and the angular displacement of the axes of each with respect to the horizontal.
Figure 2:
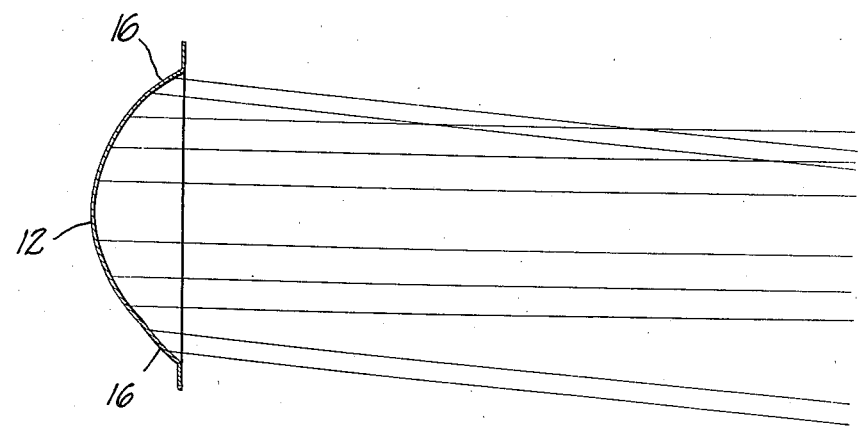
Figure 2 is a vertical section through my improved reflector taken on line 2—2 of Figure 1.
Figure 3:
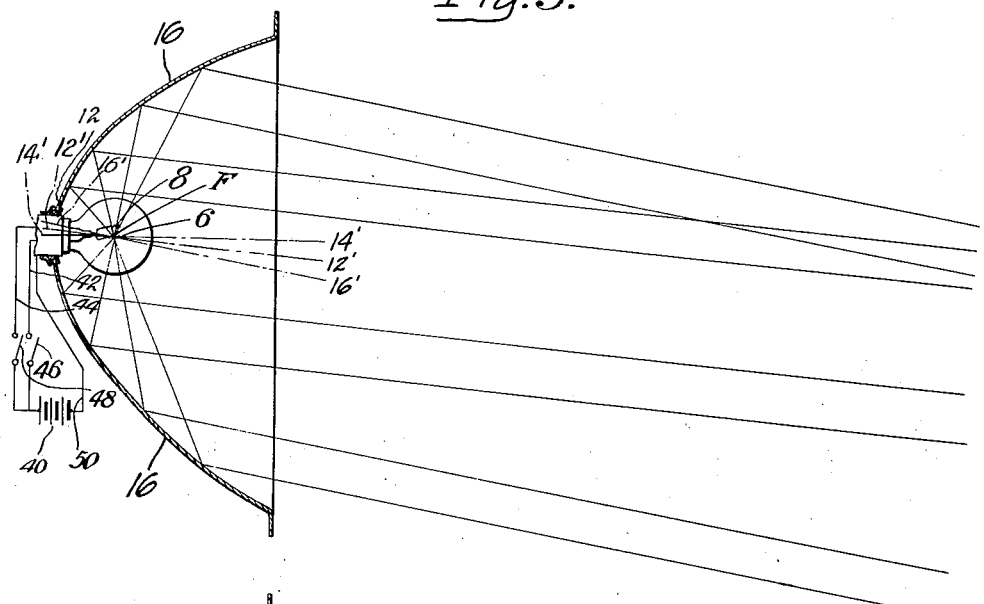
Figure 3 is a vertical section taken on line 3—3 of Figure 1 showing the direction of projected rays when the filament at the focus is the source of light.
Figure 4:
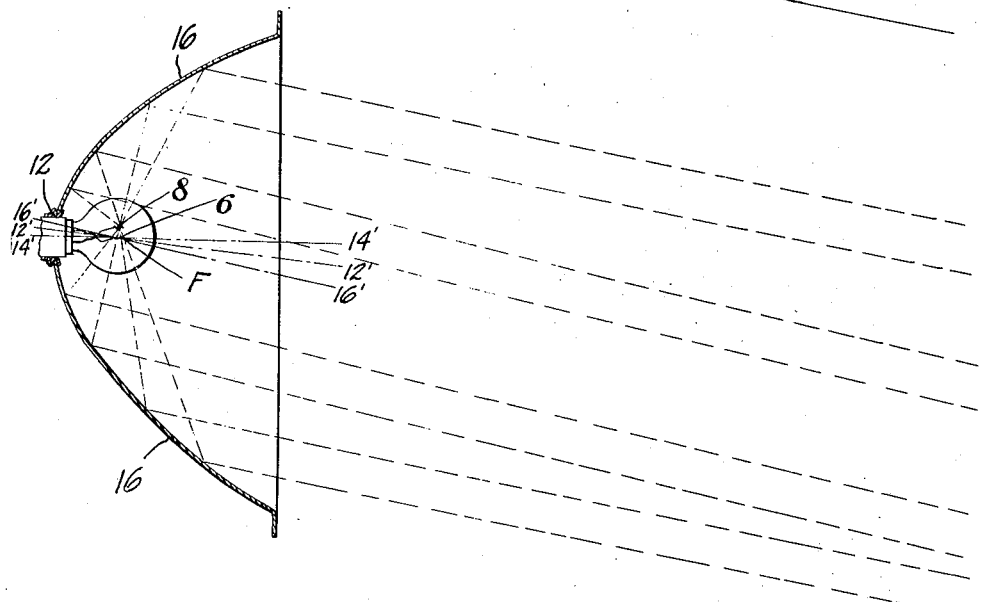
Figure 4 is a view similar to Figure 3 showing the direction of the rays when the filament above the focus is the source of light.

Before undertaking a detailed description of the preferred form of my invention, I will briefly state the principles involved in it.

Taking the simplest case, if a parabolic reflector be provided with a lighting means capable of providing a source of light at the focus or at a point above the focus there will be a different distribution of the reflected light depending upon the position of the source of light. Thus with the source of light at the focus the rays will be projected straight ahead while with the source of light above the focus much of the light, particularly that of high intensity projected from the portion of the reflecting surface nearest the focus will be thrown in a slightly downward direction. The degree of deflection of rays will vary with the distance between the sources of light and my calculations are based on the use of a two filament bulb in an automobile headlight with a distance of about ⅛ of an inch between filaments. But of course the application of my invention is by no means limited to this particular spacing.

It will be remembered that from the nature of the parabola the difference between both the angles of incidence and the angles of reflection of the rays from the two sources will be a maximum adjacent the axis of the reflector, decrease to zero at the point where the two filaments are in vertical alinement, again increase for a short distance but increase very slowly because of the diverging character of the curve, and then again decrease. On Figure 1 I have roughly divided the reflector into zones according to the changes produced in the angles of the rays projected from the different portions of the reflector when the point of emission of light is changed from the lower filament to the upper filament. Thus the central zone is marked in dotted lines −4°. This means that when the current is switched from the filament at the focus to the filament above the focus the light from this zone is bent downwardly 4°; and similarly with the zones marked in dotted lines −3°, −2°, and −1°. The uppermost and lowermost zones are marked zero degrees. This latter, strictly speaking, is inaccurate for the rays from these zones are deflected upwardly at a slight angle upon shifting the source of light but the deflection is so slight in practice as to be negligible.

The plane through the focus and at right angles to the axis of a reflector is commonly referred to as the focal plane. In general, all of the rays of light striking the top and bottom zones of the reflector slightly to the rear of the focal plane, in the focal plane, and forward of the focal plane are but slightly changed in direction when shifting from one light source to the other. Likewise all of the rays of light striking the entire central zone of the reflector, whether at the rear of the focal plane, in the focal plane or forward of the focal plane are deflected sharply downwardly upon shifting to the upper light source. It is upon this observed variation in deflection of the reflected rays from different portions of the reflector when shifting from one light source to the other that my invention depends. Obviously where the filaments are located in other positions than one above the other as disclosed in the specific embodiment of my invention, the rays reflected from the different portions of the reflector will be deflected in different amounts than those shown when shifting from one filament to the other. However my invention is equally applicable to other arrangements of light sources since it is simply necessary to study the effect of the change in location of the light source upon the direction of the rays reflected from each part of the reflector as I have done in the specific example disclosed and to then treat the reflecting surfaces in accordance with the principles hereinafter set forth.

Attention is called to the fact that the portion of the reflector where the rays are deflected the most, that is, the −4° zone, is also the portion of the reflector which receives the greatest quantity of light per unit of surface.

It will be noted that the zones shown on Figure 1 are of elliptical shape; this is another result of the positioning of the light source above the focus and is accentuated by the fact that the filament is elongated laterally.

It is now clear that with a simple paraboloidal reflector by shifting from one filament to the other I am enabled to throw the major portion of the light in a downward direction but the rays projected from the upper and lower marginal portions of the reflector remain in substantially their original position. In other words, the entire beam is not turned downwardly and this is the effect that it is desired to secure upon a shift of the light source.

The effect of a lowering of the entire beam can be secured by placing toward the bottom of the normal beam, that is the beam projected when the source of light is at the focus, rays from the top and bottom portions of the reflector where the shifting of the light source has no substantial effect on the direction of projection, and at the top of the normal beam rays from the remaining portion of the reflector where the effect of a shifting to the upper filament is to turn the projected light downward. I have employed this principle in my improved reflector shown in detail in Figures 1 to 4. This reflector is composed of a number of segments of surfaces of revolution. For purposes of illustration I have chosen segments of paraboloids but it is to be understood that my invention is not thus limited for it is well known in the art of lighting that a number of other surfaces of revolution such as hyperboloids, ellipsoids, hyperbolic paraboloids, and the like may be used as effectively as paraboloids although with slight variation in other respects in the light distribution. It is also obvious that substantially identical effects can be secured by approximation to surfaces of revolution and these also are within the scope of my invention if the principles upon which my invention rests are employed in connection with them. In the subsequent discussion, however, for simplicity I shall refer only to paraboloidal segments.

Referring again to Figures 1 to 4 I have denoted the central portion of my reflector by the reference character 12, and its axis by the numerals 12′—12′; the side portions by the reference character 14 and their axis by the numerals 14′—14′; and the top and bottom portions by the reference character 16 and their axis by the numerals 16′—16′. In this embodiment the axis 14′—14′ is the horizontal axis and is taken as the reference line. For purposes of better illustration I have exaggerated the angles which the axes 12′—12′ and 16′—16′ make with respect to the reference axis. I have shown the several paraboloidal segments as having a common focus at F although this is not essential.

I have given a downward tilt to the top and bottom portions of the reflectors; in other words the axis 16′—16′ of the top and bottom portions of the reflector is inclined downwardly with respect to the reference line 14′—14′, the amount of inclination being preferably about 2° in the specific case of an automobile headlight with one-eighth inch between filaments. This has the effect of throwing the rays of light from these portions of the reflector below the horizontal at all times. Another method of giving in effect a downward tilt to the top and bottom portions of my reflector is, for example, to form the top portion of my reflector of a segment of an ellipsoid and form the bottom portion of my reflector of a segment of a hyperboloid or approximations thereto. Thus my invention is not limited to constructions wherein the axes of different portions of the reflector are relatively inclined. With the construction so far described I have combined my two filament bulb as before, the one filament 6 being at the focus F while the other filament 8 is above the focus. I wish it also to be understood that while I have preferred to show a two filament bulb it is obvious that any other suitable lighting means may be provided, and that the lighting means need not be located in the exact manner described, the only necessary conditions being that it must be capable of providing a source of light at either of two spaced points, and that the points be so chosen as to produce a lowering of certain of the rays but not of others upon a shift in position of the light source.

Ignoring for the present the other changes in inclination of parts of the reflector, with the source of light at the focus, or very near the focus, the top of the beam is now constituted by rays from the center and sides of the reflector, and with the source of light shifted to a point above the focus these rays are turned down for the reasons already explained and, in this embodiment, to an extent to bring them parallel to or below the rays from the top and bottom portions of the reflector. These latter rays now form part of the top of the beam. Thus the effect of a lowering of the entire beam is secured for the top of the projected beam is now 2° lower than it was before.

Providing, in effect, a relatively small downward deflection of the top of the beam 2° possesses several advantages: In the first place it is about as much of a change in the forward projection of the beam under the two conditions of driving as seems to be desired; in the second place, the change is sufficiently small so that the action of the reflector is not too sensitive to inaccuracies in bulb manufacture. In explanation of the latter statement, if we assume a design such as will later be described in connection with Figure 6 in which a switching from one filament to the other, one-eighth inch apart, causes a 4° lowering of the top of the beam it is apparent that a slight variation in the position of the filaments in the manufacture of the bulb would effect an appreciable change in the direction of the projected rays which, in some cases, might result in glare. By reducing the amount of deflection produced by shifting from one filament to the other the effect of inaccuracies in bulb manufacture is at the same time reduced.

For driving in the open country it is desirable to have a concentrated beam rather than a scattered one. With the construction as so far described and without the additional feature to which I shall call attention, it is apparent that with the light at the focus there would be a concentration of light from the central and side portions of the reflector at the top of the beam and then 2° below this, light of relatively lower intensity from the top and bottom of the reflector. Between these areas would be an area which would be rather poorly illuminated. To make the distribution of light more uniform and at the same time retain the advantages of a concentrated beam I have found it desirable to shift the vertical distribution of the light in the beam without giving it a greater vertical spread. This I have accomplished by giving the central portion 12 of the reflector a slight downward tilt preferably less than the tilt given the top and bottom portions. In other words I have chosen for the central portion of my reflector a segment of a paraboloid the axis of which is downwardly inclined with respect to the horizontal, the amount of inclination preferably being about 1°.

Now with the filament at the focus in action the pattern of light upon the road will be composed of the following layers; at the top light of relatively low intensity from the 0° deflection areas 14 at the sides of the reflector; next, light of higher intensity from the 1° deflection area 12 around the center of the reflector; at the bottom, light of relatively low intensity from the 2° deflection areas 16 at the top and bottom of the reflector. An advantage of this light pattern is that while the top of the beam may be affected to a slight extent by inaccuracies in positioning of the filament in bulb manufacture the resulting bad lighting is made less harmful by the fact that the top of the beam does not contain the rays of highest intensity.

When the filament above the focus is in action the angular deflection of the rays from the different portions of the reflector is the sum of the angles through which these portions are tilted and the angles of deflection produced by the change in position of the light source. Thus the deflection of the beams from the portions 16 of the reflector remains −2° for they are substantially unaffected by the shift in position of the light source. The deflection of the beams from the center 12 of the reflector becomes the sum of the −1° that this portion of the reflector is tilted and the −4° produced by shift of light source, or a total of −5°. The deflection of the beams from the sides 14 of the reflector which are designed with 0° tilt becomes −2° in accordance with Figure 1.

The pattern of light upon the roadway is now composed of the following layers; at the top light of low intensity from the top, bottom, and sides of the reflector; at the bottom light of higher intensity from the central portion of the reflector. The vertical spread of light is now between −2° and −5° or −3° as compared with 2° spread with the filament at the focus. I have thus shifted from a concentrated beam for open country driving to a relatively diffused beam for city driving.

Another method of securing in effect a downward tilt of 1° in the direction of the projection of the rays from the central portion of the reflector is to design the central portion of the reflector with the same downward tilt as the top and bottom portions, that is, −2°. Now if the filament for normal driving be placed not at the focus but a fraction of an inch below the focus, say approximately 1/64 of an inch, when this filament is energized the light from the central portion of the reflector would be tilted upwardly 1° because of filament positioning were it not for the fact that this upward tilt is overcome by the effect of the 2° downward tilt of the central portion of the reflector, so that the net result will be a downward tilt of −1° the same as before. This shift in the position of the filament will also have the effect of slightly raising the rays from the side portions 14 of the reflector but the change is so slight as to be negligible.

To secure lateral distribution any of the methods well known in the art may be employed, and as these form no part of the present invention, they are not described.

Recapitulating the steps in the construction of my preferred form of reflector I have first worked out an ideal general curvature for the reflector to give proper distribution with a two position light source. The essential features of this design are giving the rays from the portions of the reflector which are substantially unaffected by shift in position of the light source,—that is, the top and bottom of the reflector,—a permanent downward inclination thus bringing to the top of the normal beam light from other portions of the reflector the angle of projection of which is affected by a shift in the position of the light source. As a refinement of this idea I have given the light from the central portion of the reflector a slight downward tilt with respect to the light from the sides of the reflector, thus bringing the latter to the top of the beam. I have shown in Figure 3 the circuit employed with my headlamp. This consists of a storage battery 40 supplying current through parallel leads 42 and 44 to the respective filaments, each lead having included in it a switch 46 or 48. A return lead 50 completes the circuit. The switches 46 and 48 may be manipulated as desired to secure a high beam or a low beam.

While I have specified that the one filament shall be at the focus it is to be understood that this filament need not be positioned exactly at the focus; thus, for example, a slight lateral displacement of the filament with respect to the focus is immaterial. Furthermore, as I previously stated it is not essential that all the segments of surfaces of revolution of which my reflector is composed shall have a common focus, and in such case it is apparent that there may be a number of positions of the lower filament which will be equally suitable. The essential thing is that one filament be adjacent the axis and that the other filament be a short distance above it.

I have dwelt at length upon the applicability of my reflector to automobile headlights and have, for convenience, in both the specification and claim located parts by stating the positions they would occupy in an automobile headlight; thus I have referred to top, bottom, and side portions of the reflector and to the fact that one filament is above the other. It must be distinctly understood, however, that these directional terms are used in a relative sense only and not in an absolute sense. Thus should it be desired to apply my reflector to such fields as aeronautical work or stage lighting the fact that it might be desired, for example, to project the beam in a vertical plane rather than in a horizontal plane and that consequently portions of the reflector would be tilted laterally instead of downwardly and that the one filament would be to the side of the other instead of above it would not take the device outside of the scope of my invention should it involve the principles which I have herein disclosed and claimed.

It is to be understood that the term "substantially paraboloidal" employed in the art of reflectors and possessing characteristics similar to paraboloids, although not identical in geometric form.

What I claim and desire to secure by Letters Patent is:

In a headlighting system the combination of a substantially paraboloidal reflector, a source of light adjacent the focus of the reflector and a source of light above the first named source, means for selectively energizing said sources, said reflector comprising top, bottom and central zones extending across the reflector from side to side, said top and bottom zones extending adjacent to and forward of the focal plane so that the rays projected therefrom are but slightly changed in direction upon shifting from one source to the other while the rays projected from the central zone are deflected sharply downwardly upon shifting to the upper source, said central zone comprising side and intermediate portions, said top and bottom zones being formed to project light downwardly approximately two degrees, said side portions of the central zone being formed to project light along the axis of the reflector, and the intermediate portion of the central zone being formed to project light downwardly below the light from said side portions so that the light from said side portions forms the top of the beam when the focal source is energized and the system is rendered substantially insensitive to manufacturing variations in position of the light sources, and whereby, upon shifting to the upper source, the top of the beam is dropped and the light from the top and bottom zones comes toward the top of the beam.

In testimony whereof I affix my signature.

SUMNER E. BROWN.